UNITED STATES PATENT OFFICE.

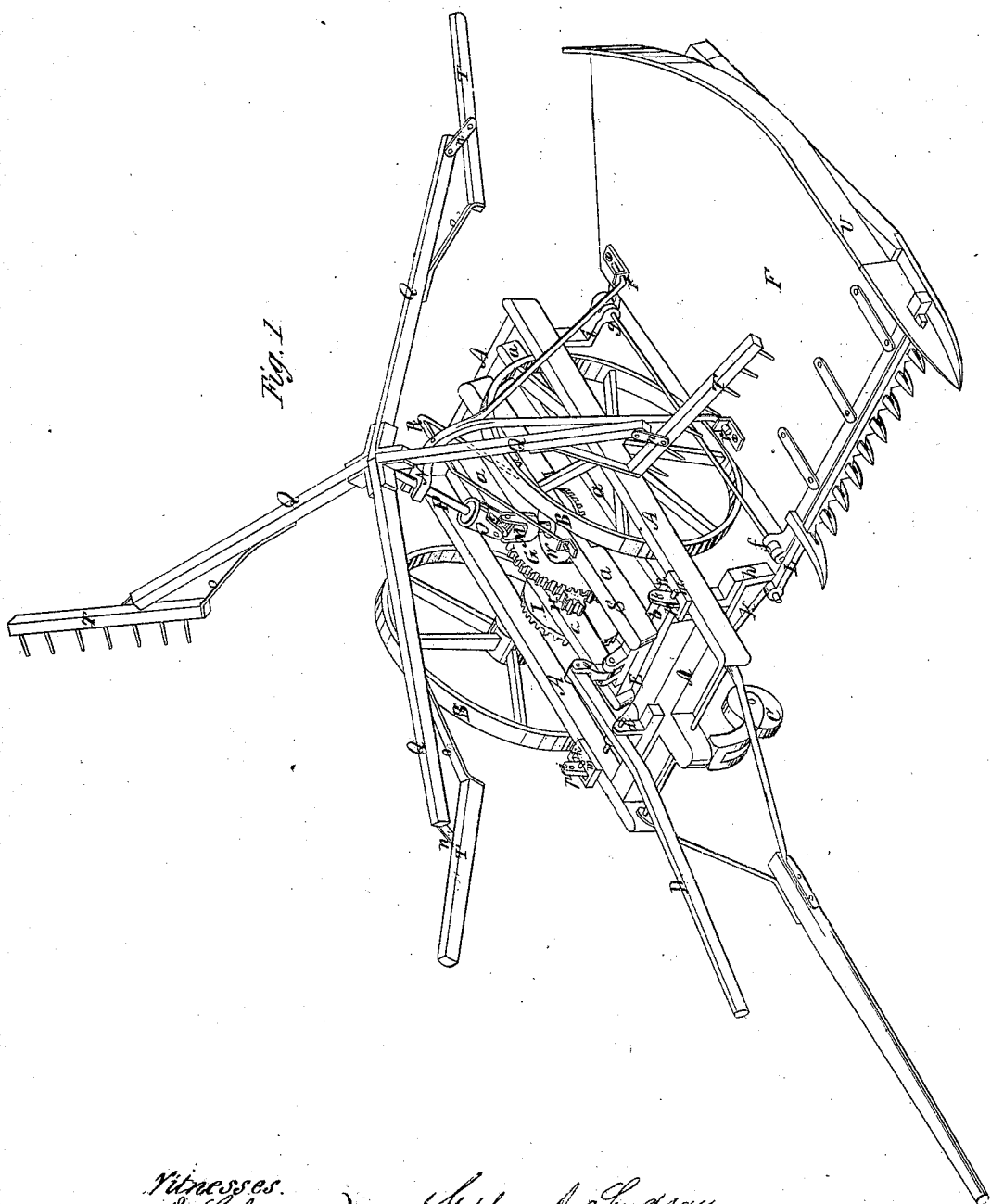

STEPHEN A. LINDSAY, OF UNIONVILLE, MARYLAND.

IMPROVEMENT IN RAKES FOR HARVESTERS.

Specification forming part of Letters Patent No. 30,882, dated December 11, 1860.

*To all whom it may concern:*

Be it known that I, STEPHEN A. LINDSAY, of Unionville, in the county of Frederick and State of Maryland, have invented certain new and useful Improvements in Automatic Rakes for Harvesters; and I do hereby declare that the following is a full, clear, and exact description of the construction and operation of the same, reference being had to the accompanying drawing, in which—

Figure 1 is a perspective view of a harvester to which my rake attachment is applied.

My invention consists in the combination of a hinged platform with an automatic and revolving rake, the shaft of which is connected with the gearing of the machine by means of a universal joint, and which shaft is supported by braces and stays secured to the platform, so as to cause the rake to rise and descend simultaneously with said platform when the machine passes over uneven or broken ground; and it further consists in connecting the rake and reel-heads to the rake and reel-shanks by means of a hinge or link and a restraining-spring, for the purpose of allowing the said heads to yield to the outside board of the platform when that side raises or lowers in passing over uneven ground.

To enable others skilled in the art to make and use my invention, I will proceed to describe its construction and operation.

A represents the frame of the machine. It is supported by the carrying and driving wheels B and by the caster-wheel C. This frame is unyielding, and being supported by those three wheels and having a loose tongue, no part of it bears on the neck of the team. The movable frame E, consisting of the longitudinal pieces $a$ and the cross-pieces $b$, is hung to the main driving-shaft, to which the wheels B are secured, and can swing on said shaft. It can be lowered and raised or retained in any desired position by means of the lever D, which has its fulcrum on the frame A at $d$, and to the end of which the frame E is hung by means of the link $e$. The long arm of the lever D extends sufficiently forward to enable the driver while riding on one of the horses which draw the machine to operate said lever, and thus to raise or lower the platform. The platform F is hinged at $f$ $g$ to the pieces $h$ $i$ of the movable frame E, and can freely play on said hinges. The entire gearing of the machine for operating the cutter-bar as well as the rake is mounted on the movable frame, and when the latter is raised or lowered the platform and rake are moved simultaneously with it, and the relative positions of the different parts are not changed. Consequently the perfect working of the parts is not interrupted. The circular guide-pieces $p$ of the movable frame E pass through the slots $k$ of the frame A and restrain said frame E from descending below a given point, while it is free to rise above that point in accommodating itself to any projections on the ground.

The gearing of the machine is as follows: The wheel G on the main shaft drives the pinion H, on whose shaft the bevel-wheel I is secured, which in its turn drives the crank-pinion, to the crank of which the pitman K is secured, which operates the cutter-bar L. The horizontal bevel-wheel W is operated by a pinion on the main shaft, and turns the shaft 1 and the fork M of the universal joint $q$, which latter turns the fork O and the inclined rake-shaft P, to which the rake and reel arms Q are secured. The upper part of the rake-shaft is supported by a forked stay, N, the forked ends of which diverge and are hinged to the platform at $r$, and thus when the outer end of the platform F is raised or lowered by the machine passing over uneven ground the upper end of the rake-shaft and the rake are raised simultaneously by means of the stay N, and descend by their own weight when the elevation in the ground has been passed over. The upper part of the stay N is prevented from moving sidewise or downward by being hinged to the brace R, which is pivoted at $s$ to the longitudinal bar S of the movable frame. The rake and reel heads T are hung to the arms Q by means of the links $n$, and they are retained in their proper working positions by the action of the springs $o$, one of which is secured to the inner end of each rake-head and to the lower side of the corresponding rake-arm. By this connection the rake-heads are made yielding and will move inward when their outer ends come in contact with the vertical side U of the platform, as may be the case when the platform passes over broken ground, whereby its outer end is raised suddenly, while the operation would be entirely interrupted in such an emergency if the rake-heads were secured rigidly to their arms. The use of the universal joint and inclined shaft obviates the necessity of a cam to raise and lower the rake and reel, as heretofore done, and is much more simple and effective than the cam movement.

Having thus fully described the nature of my invention, what I claim herein as new, and desire to secure by Letters Patent, is—

1. In combination with a hinged platform and a hinged revolving reel and rake, the inclined shaft P and universal joint $q$, for the purpose of retaining the rakes and reels in their proper relative positions to the platform when the latter is raised or lowered, substantially in the manner herein described.

2. Attaching the rakes or reels to their respective arms by means of the links $n$ and springs O, substantially in the manner and for the purpose herein described.

STEPHEN A. LINDSAY.

Witnesses:
  A. B. STOUGHTON,
  I. HIRSCH.